United States Patent [19]

Lepore et al.

[11] Patent Number: 4,958,224
[45] Date of Patent: Sep. 18, 1990

[54] FORCED CORRELATION/MIXED MODE TRACKING SYSTEM

[75] Inventors: Robert G. Lepore, Simi Valley; Hannelore G. Hansen, Sepulveda; Vivien Y. Steinman, Chatsworth, all of Calif.

[73] Assignee: Hughes Aircraft Company, Los Angeles, Calif.

[21] Appl. No.: 394,024

[22] Filed: Aug. 15, 1989

[51] Int. Cl.⁵ .............................................. H04N 7/18
[52] U.S. Cl. .................................... 358/126; 358/125; 364/516
[58] Field of Search ............... 358/125, 126, 105, 107; 364/516; 250/203 CT

[56] References Cited

U.S. PATENT DOCUMENTS 4,133,004  1/1979  Fitts .
4,272,783  6/1981  Warnstam et al. ................... 358/126
4,719,584  1/1988  Rue et al. .

Primary Examiner—James J. Groody
Assistant Examiner—Victor R. Kostak
Attorney, Agent, or Firm—Randall M. Heald; Robert A. Hays; Wand Denson-Low

[57] ABSTRACT

A tracking system 10 utilizes both a correlation processor 18 and centroid processor 20 to generate track error signals. The operator is given the option to initially select track error signals exclusively from the correlation processor 18 at track initiation. In a mixed mode of operation, track gate error signals from the centroid processor 20 are selected for each axis where the target is contrast bounded while track gate error signals from the correlation processor 18 are selected for each axis where the target is not contrast bounded.

7 Claims, 3 Drawing Sheets

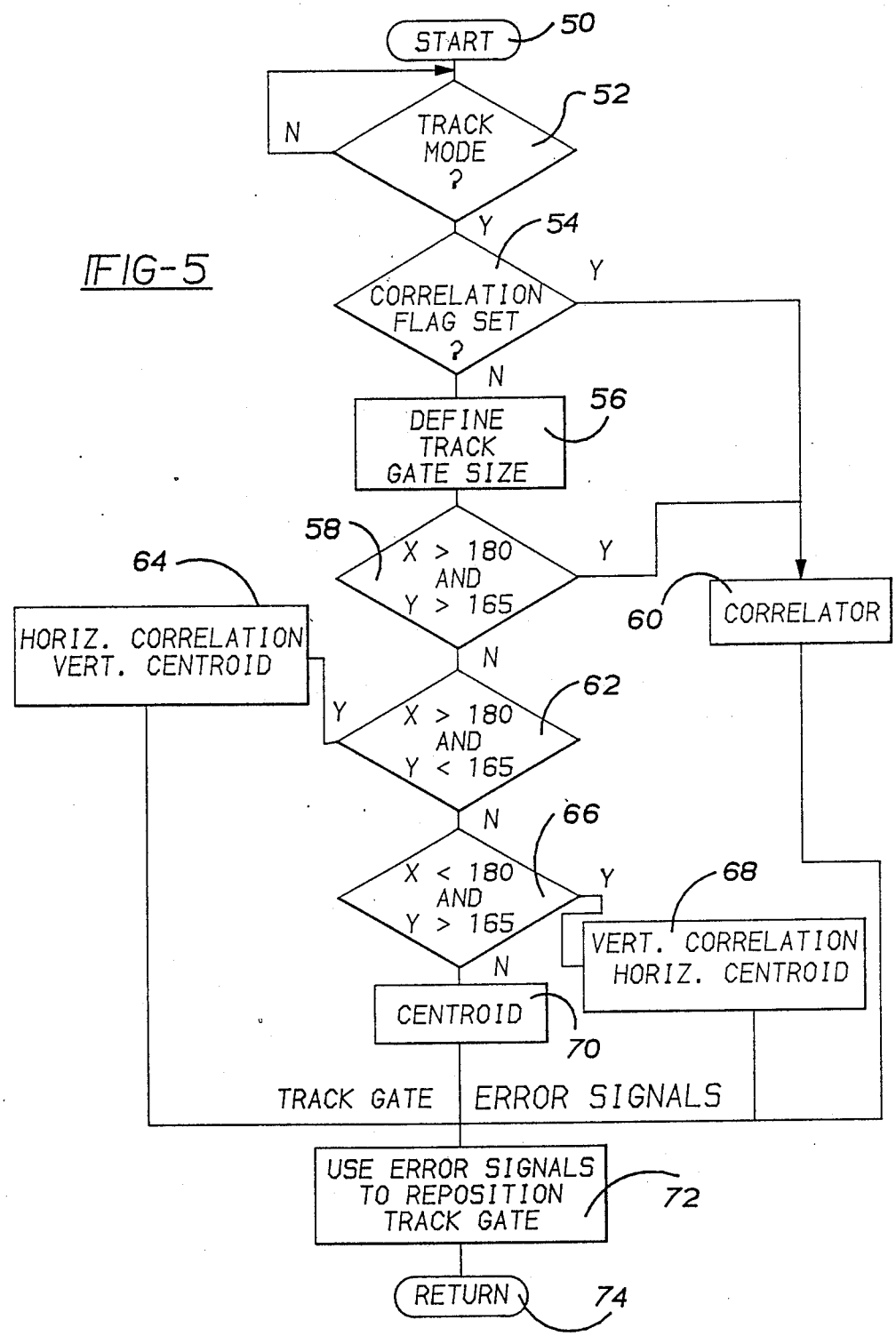

FORCED CORRELATION/MIXED MODE TRACKING SYSTEM

This invention was made with Government support under Contract No. F33657-86-C-2138 awarded by the Department of Air Force. The Government has certain rights in this invention.

BACKGROUND OF THE INVENTION

1. Technical Field

This invention relates to video processing systems and, more particularly, to a video tracker system for tracking a target.

2. Discussion

Tactical system applications for video trackers require high performance even where background and foreground clutter compete with the target of interest. Additionally, these systems must satisfactorily perform under dynamic conditions where the relative aspect angles and range to the target are continuously changing.

Video tracking processors have been devised in the past which utilize a variety of processing techniques such as centroid, area balance, edge and numerous correlation implementation concepts. Both centroid and correlation type video tracking processors are well known in the art. For example, U.S. Pat. No. 4,133,004 issued Jan. 2, 1979 to Fitts discloses a video correlation tracker. U.S. Pat. No. 4,719,584 issued January 12, 1988 to Rue et al discloses a dual mode video tracker which employs both a correlation processor and a centroid processor. The prior art tracker is capable of operating in an automatic or competitive track mode where the processor yielding the best performance is selected for active track control. However, one processor is selected to the exclusion of the other and, consequently, only the selected processor is used to generate the tracking gate error signals.

SUMMARY OF THE INVENTION

A tracking system is provided for tracking a target by using tracking error signals derived from a video processor which analyzes pixels in a track gate surrounding the target in a two dimensional image plane. In accordance with the teachings of the present invention, both a centroid processor and correlation processor are employed. The centroid processor is capable of generating track error signals along a horizontal and vertical axis as a function of the centroid of the objects in the scene. On the other hand, the correlation processor generates track error signals as a function of the relative displacement of different images of the scene. Means are provided for selecting the track error signals from the centroid processor on each axis where the target is contrast bounded and for selecting track error signals from the correlation processor when the target is not contrast bounded.

In the preferred embodiment, the tracking system allows the operator to choose a mode wherein track error signals from the correlation processor are selected for both the horizontal and vertical axes when the width and the height of an adaptive track gate exceed preselected values.

BRIEF DESCRIPTION OF THE DRAWINGS

The various advantages of the present invention will become apparent to those skilled in the art by reading the following specification and by reference to the drawings in which:

FIG. 5 is a flow chart setting forth steps for carrying out the preferred embodiment of this invention.

DESCRIPTION OF THE PREFERRED EMBODIMENT

A. Overview

Figure 1:
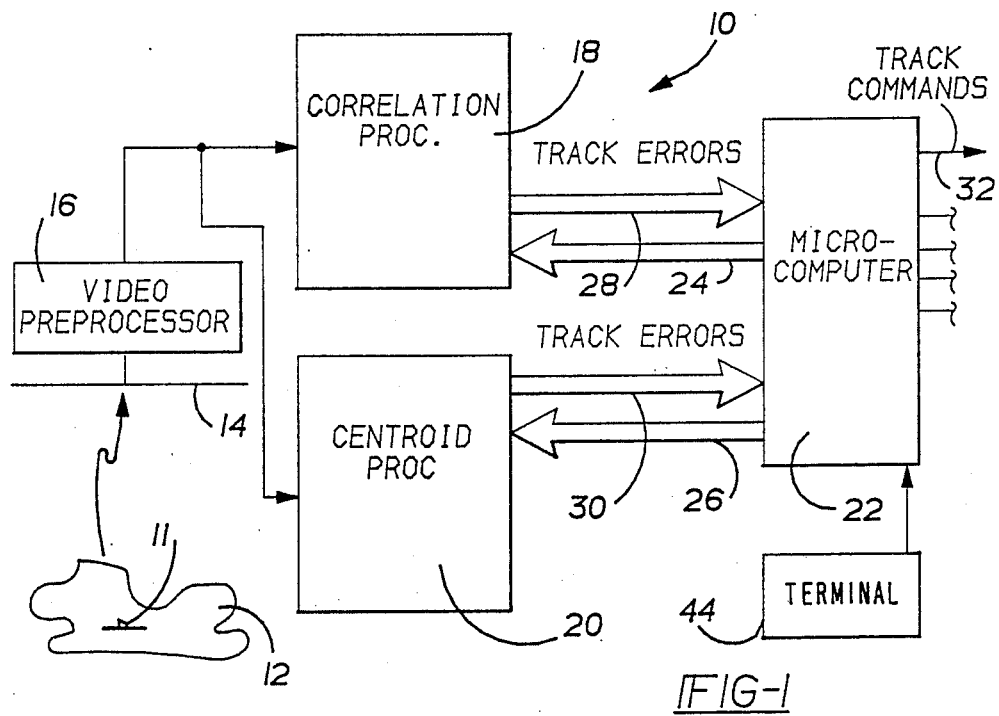
FIG. 1 is a block diagram of a video tracking system made in accordance with the teachings of the present invention.

Turning now to FIG. 1, there is shown a video tracking system 10 for following and tracking a target 11 within a scene generally designated by the numeral 12. Various sensors can be used to sense information about scene 12. Typically, sensor 14 is of the type that receives radiated electromagnetic energy from the scene 12 thereby recording the scene in a form which may be converted to electrical video signals by a video preprocessor 16. The preprocessor 16 converts the electromagnetic energy into analog video signals and delivers these signals both to a correlation processor 18 and to a centroid processor 20.

Microcomputer 22 provides timing and other control signals to correlation processor 18 over lines 24. Similar timing and control signals are provided over lines 26 to the centroid processor 20. Correlation processor 18 analyzes the video signals and, as will appear, provides track error signals over lines 28 to the microcomputer. Similarly, centroid processor provides tracking error signals over line 30 to the microcomputer 22. Microcomputer 22, in turn, utilizes the tracking error signals and generates track commands on line 32. The track commands are output to various servosystems for guiding the tracking device so that it maintains its appropriate track on the selected target.

As is know in the art, the correlation processor 18 and centroid processor 20 analyze the video data in different manners and thus have different strengths and weaknesses. Correlation processors measure the relative displacement between two different images of the same scene taken at different times. One of the images is generally referred to as the "reference" and usually represents a measurement made at an earlier time. The other images often called the "received" image and is usually derived from the "live" scene. Correlation tracking does not typically require that the target be contrast bounded and performs best when tracking large targets with much internal detail. In contrast, correlation processors do not perform as well when tracking small targets against bland backgrounds. Under such conditions the correlator may tend to drift slowly off the target and introduce tracking errors which increase with time. Correlation trackers can provide improved performance over centroid trackers in environments with low signal to noise ratio and high clutter.

Centroid processor 20, on the other hand, operates to compute the centroid of pixels in a given track gate that are either above or below a threshold value depending on the tracking mode. Track error signals are derived by a comparison of centroid values between successive image frames.

The various details of the correlation and centroid processors are well known to those skilled in the art and need not be further described herein. However, the reader is referred to the following incorporated by referenced documents for further information: the aforementioned commonly assigned U.S. Pat. Nos. 4,133,004 and 4,719,584.

Centroid tracking using centroid processor 20 is invoked for those targets that are entirely contrast bounded. In this mode a track gate is placed about the centroid of the target and tracking error signals are generated therefrom. Correlation tracking is invoked when targets are not contrast bounded. As noted before, the correlation processor 18 computes a cross-correlation function between the sensed image and a stored reference scene. The tracking point is the best match of the two scenes.

A combination of centroid and correlation tracking (mixed mode tracking) is invoked when a target is contrast bounded in one axis but not the other. During mixed mode tracking, the system uses correlation tracking to calculate the track error signals in one axis, and centroid tracking to calculate the track error signals in the other. This allows the system to use the advantages of both tracking algorithms, and minimize the disadvantages.

B. Centroid Tracking

Centroid tracking is invoked for those targets that are contrast bounded. A contrast bounded target is surrounded on all sides by a region with a resolvable intensity difference from the target, and the boundaries of the target all must have the same contrast polarity. If a target appears to be "brighter" ("darker") than its background, then it must be surrounded on all sides by a region that is at a lower (higher) intensity level.

During centroid tracking, video preprocessor 16 is used to generate multiple level input video from the incoming analog video. In the tracker field of view (FOV) (designated by the reference numeral 34 in FIGS. 2–4), a rectangular track gate 36 is placed over the spatial region where the target 38 is expected to prevent scene information outside of the gated region from interfering with tracking. Prior to track initiation the operator positions the gate location, but during centroid tracking it is placed about the target centroid. Since a wide range of target sizes must be tracked, an adaptive gate is preferably used. The size of the track gate is made slightly larger than the target to include the target silhouette within the gate, but to exclude non-target background clutter.

The gated input video signal is thresholded by preprocessor 16 to generate a binarized image for further processing by the centroid processor 20 and correlation processor 18. The digitizing threshold is adjusted to isolate the target from competing clutter and other background. The operator can select whether the thresholding algorithm is adjusted to isolate a "hot" target from a "cold" background (white track), or a "cold" target from a "hot" background (black track).

The binarized data on each row or line is formatted into a sequence of segments; the start and stop locations of each segment are provided for further processing. The segments are sorted into clusters for use by the aided target acquisition algorithm. Since several objects may be inside the expanded track gate, it is important that the segments are clustered correctly. The centroid algorithm then computes the geometric centroid of each cluster in the track gate. A tracking error signal is generated based on the centroid of the cluster with the best match to previous features.

The digitizing threshold, $V_{th}$, that generates the binarized image is determined by equation 1. This equation is based upon three parameters, background level, $V_B$, target level, $V_{TG}$, and $\alpha$. Each of these parameters is discussed in detail.

$$V_{TH} = V_B + \alpha(V_{TG} - V_B) \text{ where: } 48\% < \alpha < 75\% \quad (1)$$

The target level, $V_{TG}$, is an estimate of the warmest area inside the track gate (for hot tracking). It provides an upper limit to the digitizing threshold.

Prior to track initiation the target level is based upon peak detection. The target level can move up or down in fixed increments. It moves in a direction that will produce 3 pixels above the target threshold level, in a 19 pixel × 19 TV line window. This window includes the area of the track gate, plus a surrounding ring.

After track initiation, only the track gate area is used to set the target level. The target level is adjusted by a fixed amount to obtain a constant area balance between the target level and the digitizing level. A two-field or frame average of the area above the target level is compared to a two-field average of the area about the digitizing level. Nominally the desired area balance is given by equation 2. However in land mode, under low clutter conditions, the desired area balance is given by equation 3. This lowers the target level during low clutter conditions, and reduces the chances of hot spot collapse in benign backgrounds.

$$A_{TG}/A_{TH} = \tfrac{1}{4} \text{Nominally} \quad (2)$$

$$A_{TG}/A_{TH} = \tfrac{1}{8} \text{Land Mode, Low Clutter} \quad (3)$$

Where:

$A_{TG}$ = number of counts above $V_{TG}$ in the track gate
$A_{TH}$ = number of counts above $V_{TH}$ in the track gate The background level, $V_B$, provides a lower limit to the digitizing threshold (FIG. 2), and is an estimate of the temperature of the region bounding the target. A two-field or frame average of the percentage fill in the background gate is used to adjust $V_B$ to prevent noise from influencing the digitizing threshold. In land mode $V_B$ is adjusted based on a background gate in the form of a ring. In ship mode $V_B$ is adjusted based on a background gate in the form of horizontal bars.

The third parameter used in calculating the digitizing threshold, $V_{TH}$, is $\alpha$. It is used to adjust the threshold generated by the target and background levels, and ranges between 0.48 and 0.75. During target acquisition, $\alpha$ is fixed at 0.65, to separate the target from the clutter and noise. Otherwise, it is adapted based on the content of the track gate and the clutter rings. In high clutter conditions $\alpha$ is raised to 0.75, and $\alpha$ is lowered to 0.48 in the presence low clutter.

The gate sizing algorithm is performed by the centroid processor 20 which calculates the track gate dimensions along the horizontal and vertical axes ($X_{gate}$, $Y_{gate}$) independently in the horizontal and vertical directions. (equations 5 and 6) The change in the gate size is compared to the maximum allowable gate growth due to range closure and is limited, if necessary, to that value. The track gate is centered about the target centroid. The stability of the track gate is maintained by taking a five-field or frame average of the measured horizontal and vertical target size or extents, $X_{extent}$ and $Y_{extent}$ respectively. The horizontal extent ($X_{extent}$) is calculated by taking the difference between the rightmost and leftmost pixel positions of the digitized segments in the track gate. Analogously, the vertical extent ($Y_{extent}$) is derived from the difference between the top and bottom line number of the first and last segment in the track gate. The track gate size is defined by the following equations (5) and (6):

$$X_{gate} = G_X \cdot \overline{X}_{extent} + BIAS_X \quad (5)$$

$$Y_{gate} = G_Y \cdot \overline{Y}_{extent} + BIAS_Y \quad (6)$$

Where:
$G_X, G_Y > 1$ $BIAS_X, BIAS_Y > 0$, based on $X_{extent}$ and $Y_{extent}$ respectively Once the gated region is thresholded, the binarized segments are grouped into distinct objects. This process of identifying the disjoint elements of objects is termed clustering. Clustering involves scanning the region of interest (i.e., track gate) by rows and forming equivalence classes of object segments. These equivalence classes are subsequently merged and the image's clusters are labeled accordingly.

The adaptive gate sizing algorithm does not allow the track gate to grow fast enough while acquiring large targets. Aided target acquisition (ATA) enhances the centroid tracker's ability to acquire and place an appropriately size track gate about the selected target.

When the operator initiates track, the track gate opens to 45 pixels or columns ×45 TV lines or rows. The algorithm selects the cluster containing the closest segment to the center of the track gate. The track gate is moved to the selected cluster, and when ATA is exited the track gate is sized as closely as possible to the target and centroid tracking begins.

During ATA, if the target is not completely contained in the 45 pixels ×45 TV lines track gate, one or both of the dimensions may be enlarged to the maximum size, and the process is repeated. If after the gate size has been expanded, an extent is still too large, one of the two mixed mode tracking algorithms is selected. If both extents are too large then correlation tracking is selected. The decision to switch to mixed mode tracking is postponed when the aspect ratio of the target is greater than 3:5 in land mode or 2:1 in ship mode, to allow detection of a hump for invoking aspect ratio limiting.

The total binarized area within the track gate is used to compute a geometric centroid relative to the upper left corner of the FOV. The target centroid is used to position the track gate center lines 40,42 on the next field. The centroid ($X_{centroid}, Y_{centroid}$) of the binarized video within the track gate 36 is generated as a function of the horizontal and vertical moments, respectively, of the segments within the track gate.

Aspect ratio limiting (ARL) was designed to prevent premature handover to the correlator tracker for targets with large aspect ratios, since a sufficient number of correlator cells will not be utilized. For a 4:1 aspect ratio, seen in many ships, bridges and power plants, when the horizontal extent reaches 50% of the field of view, the vertical extent spans 10%, or less. This is clearly undesirable for correlator tracking. In these cases the vertical extent should control the transition to correlation tracking, and delay handover until the target height is appropriate.

During the conventional centroid track mode the target aspect ratio (TAR = $X_{extent}/Y_{extent}$) is calculated each field. If the TAR is greater than 3.5:1 (2:1 in ship mode), and a definable structure that subtends less than 60% of the track gate exists, the horizontal track gate will collapse. Centroid tracking in the horizontal axis will continue based on the internal structure of the target (e.g. superstructure of a ship). In land mode during ARL tracking, the vertical centroid and track gate are calculated as in normal centroid tracking, but in ship mode the vertical centroid may be biased downward towards the expected waterline (weighted centroid algorithm). The waterline is estimated as the last hull line in the track gate. A hull line is defined as any segment that passes through both sides of the track gate.

The horizontal centroid is calculated using only the segments in the track gate that do not have endpoints touching the track gate. Any line passing entirely through the gate is not used for horizontal positioning. The horizontal gate size is modified according to equation 9. If ARL is not invoked, the horizontal gate size is returned to the original size.

Once ARL mode is invoked it cannot be exited, and remains active until either the horizontal correlation/vertical centroid, or correlation modes are invoked.

C. Correlation Tracking

Correlation processor 18 measures the relative displacement between two different images of the same scene. Additional information about correlation processors can be found in M. Bohner, Target Tracking and Target Detection in TV-and FLIR-Imagery. Forschungsinstitut fur Informationsverarbeitung und Mustererkennung (FIM/FGAN), Breslauer Strasse 48, 7600 Karstruhe Fed. Rep. Germany, 31-1 through 31-16 (1981), which is also hereby incorporated by reference. One of the images is called the reference, and may represent a measurement made at an earlier time. The other image is called the received image, and usually is derived from the "live." scene. Correlation tracking does not require that the target be contrast bounded, and performs best when tracking large targets with much internal detail. Correlators do not perform as well when tracking small targets against bland backgrounds. Under such conditions, the correlator may tend to drift slowly off the target, and introduce a tracking error which increases with time. Correlation trackers can provide improved performance over centroid trackers in environments with low SNR and high clutter.

There are many cases for which correlation tracking is inherently better than centroid tracking. Correlation tracking is preferred if the target to be tracked cannot be isolated readily and automatically. This can occur when the target is in the midst of other objects (clutter) that are too close to the target to be gated out, or if the clutter signals are too strong to be rejected by the thresholding algorithm. The correlation tracker is chosen to select one object within a cluster of similar objects, where the target is specified by its relative position, or when a vulnerable aimpoint other than the target centroid is desired. Correlation tracking can also be used to track internal target detail and maintain a stable terminal tracking point when the target image size exceeds the tracker field of view.

In either correlation mode, sampled areas of the scene are stored in memory and compared to the same cells of subsequent fields (see the following incorporated by referenced article for more details: T. K. Lo and G. Gerson, "Guidance system position update by multiple subarea correlation," in *Digital Processing of Aerial Images*. Proc. SPIE 186, 30–40 (1979). A cross correlation of each cell is performed between the previous field stored in memory and the current field. Each correlation is tested for validity and the matched points of those cells determined to be valid are combined to calculate the size and direction of the tracking error. The correlator tracker uses the detail of the scene to maintain the aimpoint position established at the time of handover to correlation tracking. The aimpoint position is either established by operator selection when tactical force correlation mode is invoked, or by the centroid tracking algorithm if correlation mode is invoked by the target size.

The flow chart of FIG. 5 is useful in understanding certain features of the present invention. It is one feature of this invention that the operator has the option to force the system 10 to use the correlation processor 18 to generate the track error signals. System 10 includes a suitable terminal 44 (Figure or other input device that allows the operator to select tactical force correlation mode at track initiation. This operator action sets a flag which is read by microcomputer 22 as represented by decision block 54 in the flow chart of FIG. 5. Under such conditions, the correlation processor 18 is used exclusively to generate the track error signals that are used to reposition the track gate 36.

D. Forced Correlation/Mixed Mode Tracking

Figure 2:
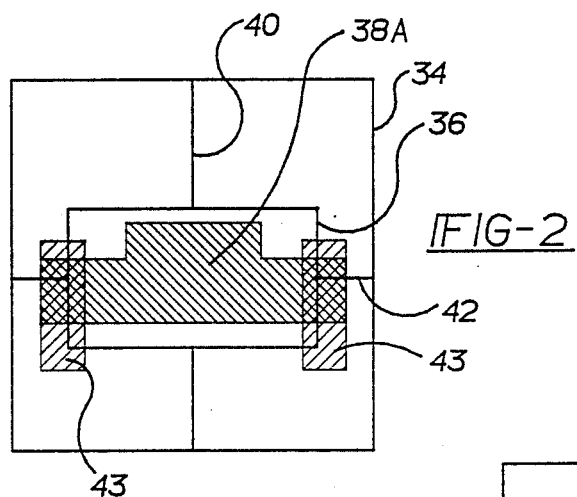
FIG. 2 illustrates a video frame where one mixed mode of operation is employed.
Figure 3:
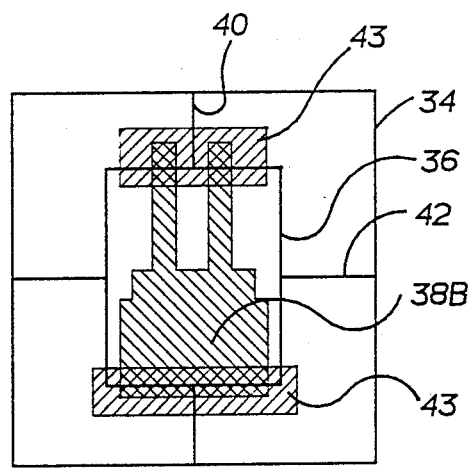
FIG. 3 is a video frame where another mixed mode of operation is employed.

If the system operator has not forced the selection of the correlation processor, then the decision process is performed automatically as a function of the track gate size. As discussed earlier, the track gate size is, in turn, a function of the size or extent of the target. Unfortunately, it is not always possible for the system to identify the target edges sufficiently so that the target is contrast bounded by the track gate. For purposes of this invention, the term "contrast bounded" means that the target is surrounded on all sides by a region with a resolvable intensity difference from the target and the boundaries of the target all must have the same contrast polarity. FIG. 2 illustrates a situation in which the target 38A is not contrast bounded on the X aimpoint axis 42. On the other hand, FIG. 3 illustrates a field of view wherein the target 38B is not contrast bounded along the Y aimpoint axis 40. The failure of the targets to be contrast bounded can be due to a variety of factors as noted above. In FIGS. 2 and 3, this is represented by the occurrence of clutter 43 that are too close to the target 38 to be gated out.

In accordance with the present invention, the microcomputer 22 automatically selects track error signals from the centroid processor 20 on each axis 40, 42 where the target 38 is contrast bounded. On the other hand, microcomputer 22 selects track error signals from the correlation processor 18 on each axis where the target is not contrast bounded. For example, target 38A is contrast bounded along the vertical aimpoint axis 40 but not in the horizontal aimpoint axis 42 in FIG. 2. As a result, the system 10 invokes a "mixed mode" tracking where the centroid processor 20 generates the track error signals along the vertical axis while the correlation processor 18 generates the track error signals along the horizontal axis. In FIG. 3, the reverse situation is at hand. In this case, the centroid processor 20 is used to generate track error signals along the horizontal axis while the correlation processor 18 is used to generate track error signals along the vertical axis.

The system 10 conveniently uses the track gate size as an indication as to whether the target is contrast bounded. As represented in blocks 62 and 66 in FIG. 5, if the track gate has a width of greater than 180 pixels, the target is considered not to be contrast bounded along the horizontal axis. Analogously, if the height of the track gate is greater than a selected number of video scan lines, then the target is not contrast bounded along the vertical axis.

Figure 4:
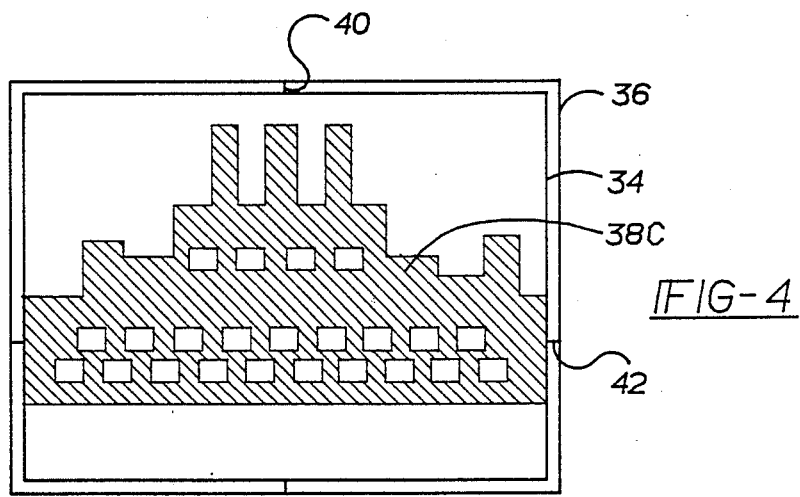
FIG. 4 is a video frame where the use of the correlation processor is forced.

FIG. 4 illustrates a situation where the tracker has been delivered so close to the target 38C that the track gate 34 is substantially coextensive with the field of view 36. In these circumstances, the correlation processor is preferable over the centroid processor since the target is relatively large and will usually have much internal detail. Again, the system 10 uses the track gate size as a signal to shift the responsibility solely to the correlation processor 18. This is illustrated in FIG. 5 by decisional block 58 where the size of the track gate in both the X and Y axis exceed predetermined values (180 pixels and 165 lines, respectively).

It should be understood that while this invention was described in connection with one particular example, that other modifications will become apparent to those skilled in the art after having the benefit of studying the specification, drawings and following claims.

What is claimed is:

1. A tracking system comprising:
    a detector for providing video image signals of a scene containing a target and background clutter;
    means for digitizing the video image signals into binary pixels;
    a centroid processor capable of generating track error signals along a horizontal and vertical axes as a function of the centroid of objects in the scene;
    a correlation processor capable of generating track error signals along said horizontal and vertical axis as a function of the relative displacement of different images of the scene; and
    selection means for automatically selecting track error signals from the centroid processor on each axis where the target is contrast bounded, said selection means selecting track error signals from the correlation processor on each axis where the target is not contrast bounded.

2. The tracking system of claim 1 which further comprises:
    track gate sizing means for adaptively defining a track gate having a width of a selected number of pixels and a height of a selected number of video scan lines, the width and height being a function of the extent of the target in the image; and wherein:
    track gate error signals from the correlation processor are selected for both the horizontal and vertical axes when the width and height of the track gate exceed preselected values.

3. The system of claim 1 wherein track error signals are selected for the horizontal and vertical axes from the correlation processor and centroid processor, respectively, when the width of the track gate is greater than a selected number of pixels and the height of the track gate is less than a given number of scan lines.

4. The system of claim 3 wherein track error signals are selected for the horizontal and vertical axes from the centroid processor and correlation processor, respectively, when the width of the track gate is less than a given number of pixels and the height of the track gate is greater than a given number of scan lines.

5. The system of claim which further comprises:
aspect ratio limiting means for preventing said selection means from selecting track error signals from the correlation processor for targets having a preselected aspect ratio.

6. In a tracking system for tracking a target by using tracking error signals derived from a centroid processor and a correlation processor, the improvement comprising:
a centroid processor for generating track error signals along horizontal and vertical axes as a function of the centroid of objects in the scene;
a correlation processor for generating track error signals along said horizontal and vertical axes as a function of the relative displacement of different images of the scene; and
operator selection means for permitting an operator to manually select track error signals exclusively from the correlation processor.

7. A tracking system for tracking a target by using tracking error signals derived from a centroid processor or a correlation processor, wherein the system comprises:
track gate sizing means for adaptively defining a track gate having a width of a selected number of pixels and a height of a selected number of video scan lines, the width and height being a function of the extent of the target; and
selection means for automatically exclusively selecting track gate error signals from the correlation processor when the width and height of the track gate exceed preselected values whereby the correlation processor is automatically selected when the target is relatively close to the tracking system.

* * * * *